Figure 1:
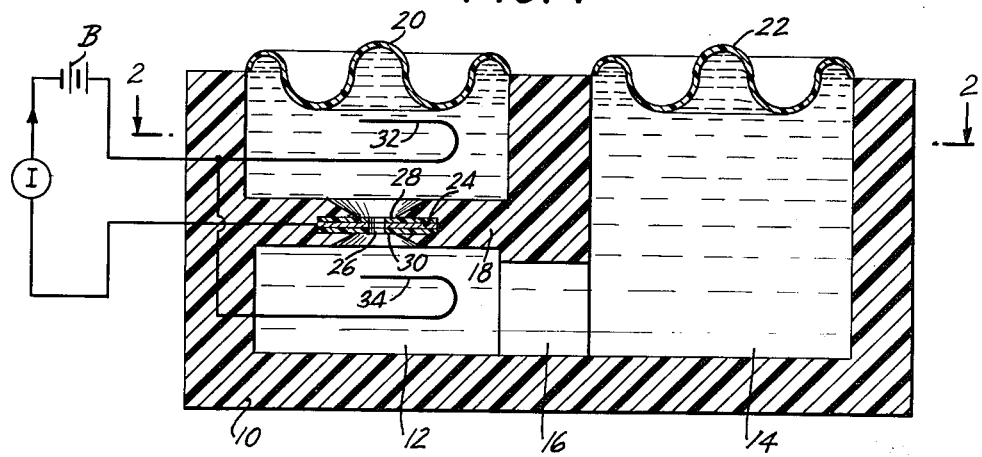

Jan. 4, 1966

G. T. KEMP 3,227,932

ELECTROCHEMICAL TOUCH DETECTOR

Filed March 10, 1961

3 Sheets-Sheet 1

INVENTOR.
GEORGE T. KEMP

BY
John F. Hohmann
ATTORNEY

Jan. 4, 1966   G. T. KEMP   3,227,932
ELECTROCHEMICAL TOUCH DETECTOR
Filed March 10, 1961   3 Sheets-Sheet 2

INVENTOR.
GEORGE T. KEMP
BY
ATTORNEY

# United States Patent Office 3,227,932
Patented Jan. 4, 1966

3,227,932
ELECTROCHEMICAL TOUCH DETECTOR
George T. Kemp, Austin, Tex., assignor to Union Carbide Corporation, a corporation of New York
Filed Mar. 10, 1961, Ser. No. 94,896
11 Claims. (Cl. 317—230)

This invention relates to an electrochemical touch detector and has particular reference to an improved construction for such devices.

The basic principles of electrochemical detectors are given in a paper by Hurd and Lane, "Principles of Very Low Power Electrochemical Control Devices," Journal of the Electrochemical Society, volume 104, No. 12, December 1957. One type of detector has the property that the electrical current (or the voltage across a series resistance) in an external biasing circuit is directly proportional to the volume flow rate of fluid through a detecting element. This type is known as a linear detector. Still another type has the property that the electrical current is a logarithmic function, and this type is known as a log detector.

Briefly, these devices generally comprise a housing divided into two compartments, one wall of which is a flexible diaphragm. Each of the compartments contains a solution of an electrolyte composed of a reversible redox system, and in each compartment is an electrode inert to the solution therein. Between the compartments is a partition in which is mounted a detecting electrode. The detecting electrode is composed, for example, of a thin platinum disc having a tiny orifice for permitting fluid flow therethrough. In devices thus far produced, the flexible diaphragms have been located on opposite sides of the housing in each compartment.

When a voltage is applied across the electrodes in the compartments, a measured species of the redox system in solution becomes dilute at the detecting electrode, and an electrical current flows in an external biasing circuit. Now if a signal, such as an acoustical pressure, is applied to the flexible diaphragm defining one wall of either compartment, the solution in that compartment starts to flow through the tiny orifice, whereupon a greater concentration of the measured species become available at the detecting electrode and a proportional increase in the electrical current observed.

Devices of the type just described have been used as transducers of various sorts for measuring very small forces at low frequencies generally below about two-hundred cycles per second. Their use, however, has been somewhat limited in applications where the whole device as a unit is subjected to motion, for example, small amounts of vibration. These vibrations have been found to result in a translational acceleration of the housing normal to the plane of either diaphragm and due to the inertia of the fluid, a pressure drop approximately proportional to the length of the fluid path between opposing diaphragms is created which may produce an extraneous or unwanted signal. The device has thus responded much in the same manner as an accelerometer. These vibrations have also been found to produce a rotational acceleration. This acceleration in itself has resulted in only small unwanted signals, but the important effect has been the angular displacement in the end-over-end direction. Such angular displacement has produced large signals due to the driving force of the weight of the volume of contained fluid, the magnitude of the effect being approximately proportional to the angle of rotation. These two phenomena have greatly diminished the field or usefulness of the devices described.

It is therefore the principal object of this invention to provide an electrochemical touch detector which will overcome the disadvantages of prior devices of this kind. Another object is an electrochemical touch detector which is capable of giving a useful response to a signal under a variety of conditions. Another object is an electrochemical touch detector which is unaffected by translational or rotational accelerations from extraneous vibrations transmitted to it. Still another object is an electrochemical touch detector which is capable of filtering out from its response spurious signals from a numebr of sources which are encountered in the environment in which it is used. A further object is an electrochemical touch detector which has a very low response to low frequency signals. A still further object is an electrochemical touch detector which is relatively small, simple in design and operation, and which has a wide application for use where only very small forces are to be measured.

The invention by means of which these objects are achieved is an electrochemical touch detector comprising a housing having two compartments therein filled with an electrolyte of a solution containing a reversible redox system, one wall of which compartments include a flexible diaphragm. The flexible diaphragms are mounted on the same side of the housing and preferably in substantially the same plane therein, whereby the effective length of the fluid path available for transmitting extraneous signals through the device is reduced nearly to zero.

Figure 2:
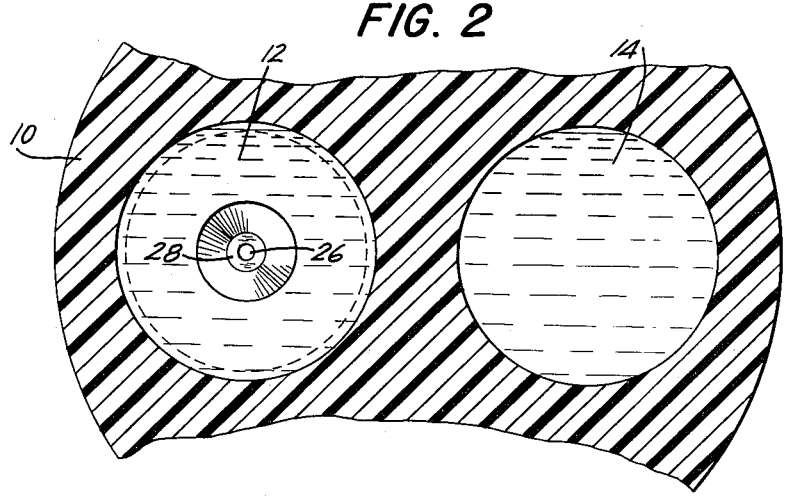
Figure 3:
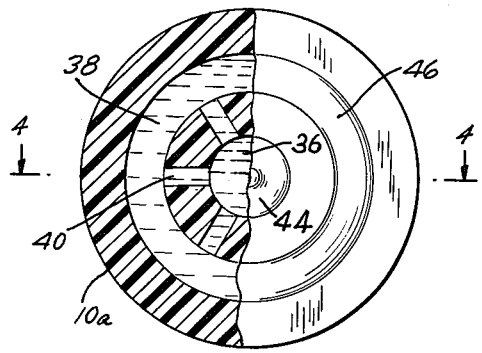
Figure 4:
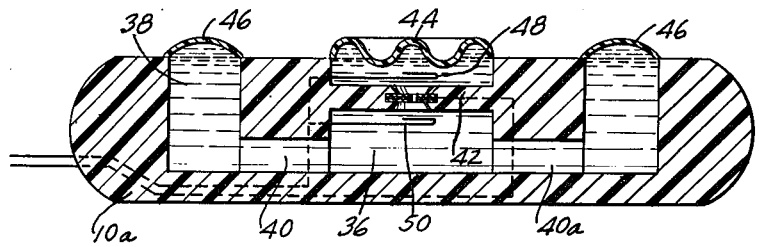
Figure 5:
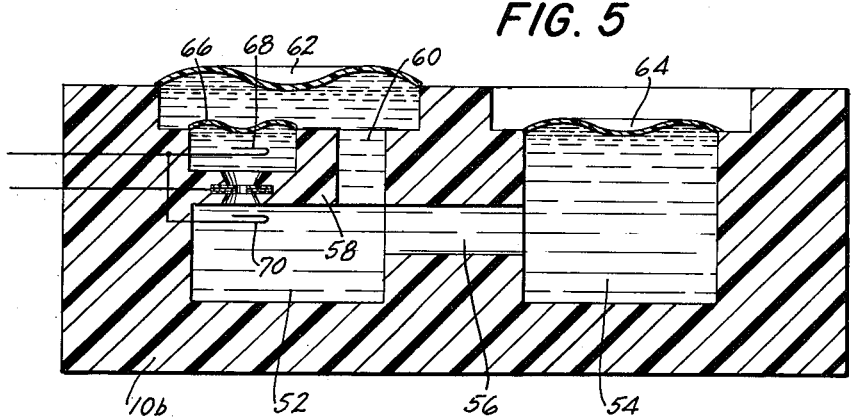
Figure 6:
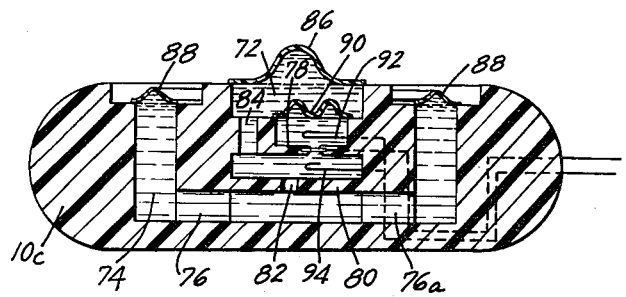
Figure 7:
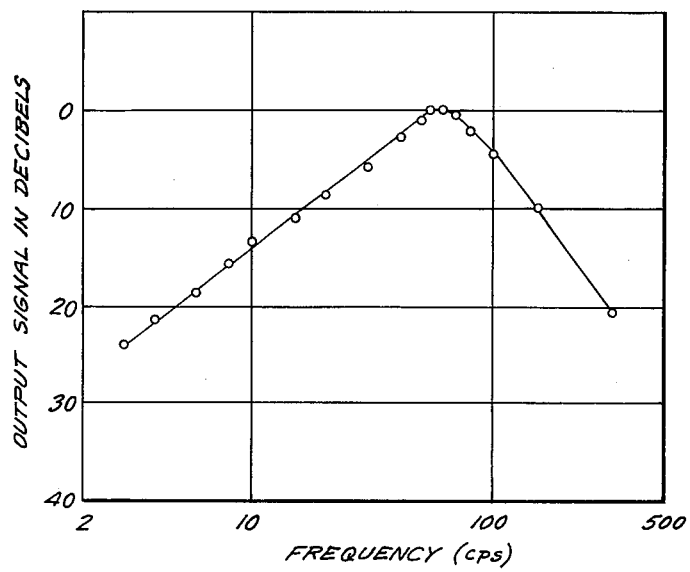
Figure 8:
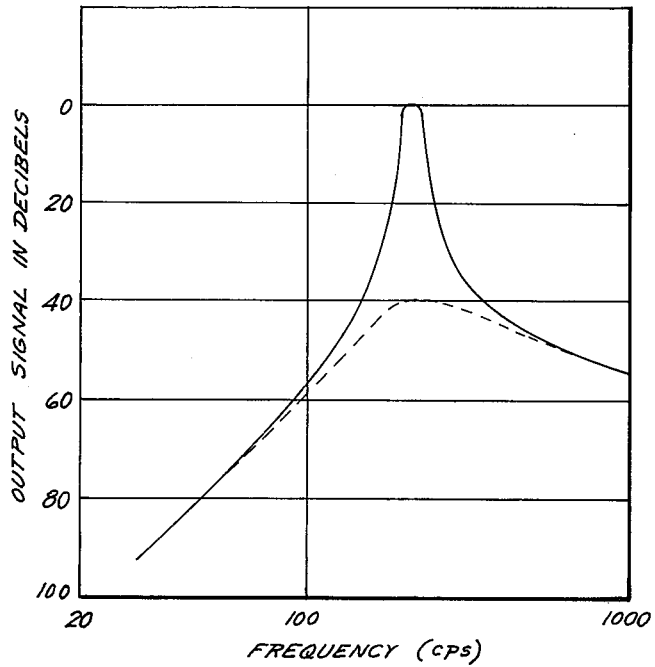

In the accompanying drawings:
FIG. 1 is a vertical section of a device embodying the invention;
FIG. 2 is a fragmentary section taken along the lines 2—2 of FIG. 1;
FIG. 3 is a plan view partially in section of a modification of the device shown in FIG. 1;
FIG. 4 is an enlarged vertical section taken along the lines 4—4 of FIG. 3;
FIG. 5 is a vertical section of another modified device embodying the invention;
FIG. 5 is a vertical section of another modified device embodying the invention;
FIG. 6 is a vertical section of a similar modification of the device shown in FIG. 3; and
FIGS. 7 and 8 are curves showing typical response characteristics for devices embodying the invention.

Referring to the drawings and particularly to FIG. 1, an electrochemical touch detector embodying the invention comprises a housing 10 having therein a pair of adjacently disposed cavities 12, 14 connected by a corridor 16, each of which cavities 12, 14 has its opening on the same side of the housing 10. A partition 18 in the cavity 12 divides the housing 10 into two compartments. One wall of each compartment includes a flexible diaphragm 20, 22 which is mounted in the opening for each cavity 12, 14 respectively. Mounted in the partition 18 is a detecting cathode comprising a thin platinum disc 24 having therein a tiny orifice 26 for permitting fluid flow from one compartment to the other, each side of the platinum disc 24 being insulated by a thin layer of plastic 28, 30, for example. Electrodes 32, 34 are provided in each compartment and are connected to a biasing circuit including a biasing battery B and an ammeter I, the particular arrangement of the biasing circuit shown being such that the electrodes 32, 34 are anodes. Each compartment is filled with a solution of electrolyte comprising a reversible redox system.

For the sake of conciseness, the operation of the touch detector described will now be disclosed with reference to the use of an electrolyte in the iodine-iodide system, although as will be pointed out below, other reversible redox system may be used as electrolyte. In this system, iodine which is dissolved in an aqueous solution of potassium iodide exists predominantly as the tri-iodide ion, $I_3^-$.

When the device is properly biased, a reaction takes place at the electrodes, the iodine ion being reduced to iodide at the cathode but replenished at the anode electrodes 32, 34 in accordance with the following equations:

$$\text{Cathode: } I_3^- + 2e \rightarrow 3I^-$$
$$\text{Anode: } 3I^- - 2e \rightarrow I_3^-$$

Thus, a concentration of iodine is produced at the anode electrodes 32, 34 while the iodine content in solution at the cathode is depleted. Due to this difference in iodine concentration, there is a tendency for diffusion of iodine from the anode electrodes 32, 34 to the cathode. This diffusion causes the cathode to produce a residual electrical current in the biasing circuit which is indicated by the ammeter I, but this current remains substantially constant. However, any increase in the fluid flow through the orifice 26 of the cathode caused, for example, by any pressure applied to either one of the flexible diaphragms 20, 22 will produce a proportional increase in the electrical current flowing in the biasing circuit. Thus, in response to a signal, an electrical current is produced that can be measured.

With the construction described, the flexible diaphragms 20, 22 are mounted on the same side of the housing 10 and in the same plane, thus reducing to zero the effective length of the fluid path for transmitting driving forces through the solution, the direction of which is normal to the plane of the diaphragms 20, 22. This reduces the response of the device to translational acceleration normal to the diaphragm plane, and thus makes it highly acceptable for use as a touch detector in cases where the entire unit is subject to motion, such as vibration.

A construction which also eliminates the effects of rotational acceleration is shown in FIG. 3. Here, a touch detector comprises a housing 10a having therein a pair of concentric cavities 36, 38 and a plurality of equally spaced radial corridors such as indicated at 40, 40a in FIG. 4, there being six such corridors in the construction illustrated, which corridors connect the cavities 36, 38. A partition 42 in the cavity 36 divides the housing 10a into two compartments. Each compartment has one of a pair of flexible diaphragms 44, 46 which are concentrically mounted in the openings for the cavities 36, 38 respectively and which lie in the same plane in the housing 10a. A detecting cathode similar to that shown in FIG. 1 is mounted in the partition 42. Electrodes 48, 50 are provided for the compartments which are filled with a solution containing a reversible redox system. In this construction, the flexible diaphragms 44, 46 are arranged symmetrically about the axis of rotation of the touch detector and thus decidedly reduce its response to rotation. A touch detector constructed as thus described is well suited for use where motion in any direction is encountered.

Another construction for the touch detector which is particularly useful at very low frequencies of vibration is illustrated in FIG. 5. As shown, a touch detector of a construction similar to FIG. 1 comprises a housing 10b having therein a pair of adjacently disposed cavities 52, 54 which are connected by a corridor 56. The cavity 52 has a partition 58 which divides the housing 10b into two compartments. The partition 58 has mounted therein a detecting cathode similar to that shown in FIG. 1 and also has a filter corridor 60 which directly connects the two compartments. A pair of flexible diaphragms 62, 64 are mounted in the cavities 52, 54 respectively for each compartment. The construction differs from that shown in FIG. 1 in that a flexible diaphragm 66 is also mounted over the detecting cathode. The flexible diaphragm 64 is also slightly recessed in the opening for the cavity 54, this particular construction being suitable for use when the signal to be measured is applied to only the diaphragm 62. It will be understood, however, that both of the flexible diaphragms 62, 64 may be mounted in the same plane as shown in FIG. 1, for example. Electrodes 68, 70 are provided for the compartments and each compartment is filled with a solution containing a reversible redox system.

The touch detector just described is similar in operation to the construction shown in FIG. 1 but is characterized by its ability to filter out very low frequency signals from its response. Thus, if a signal, such as an acoustical pressure, which is to be measured is applied to the flexible diaphragm 62 of the touch detector, it will be seen that any fluid flow through the solution must go through the corridor 56 which connects the cavities 52, 54. This fluid flow is divided, part being through the cathode orifice and the balance being through the filter corridor 60. The ratio at which the fluid flow is thereby divided is determined by the frequency of the applied signal. In response to fluid flow through the cathode orifice, the ion concentration at the cathode is disturbed and an electrical current flows in an external biasing circuit as described above for the touch detector of FIG. 1. The magnitude of the current depends on both the amplitude and frequency of the applied signal.

Now, if a very low frequency signal is applied to the same flexible diaphragm, the impedance of the flexible diaphragm at these frequencies is high and only a small fluid flow occurs through the solution in response to the signal. Moreover, the flexible diaphragm 66 has a relatively high impedance which forces practically all of the fluid flow which does occur through the filter corridor 60 in the partition 58, bypassing almost completely the cathode orifice, so that the ion concentration at the cathode remains substantially undisturbed. Thus, practically no current flows in the biasing circuit and the response of the touch detector to low frequency signals is thereby reduced to a very low value.

A construction of the type shown in FIG. 3 but which is similarly modified for use at very low frequencies of vibration is illustrated in FIG. 6. As shown, a touch detector comprises a housing 10c having therein a pair of concentric cavities 72, 74. The cavities 72, 74 are connected by a plurality of equally spaced radial corridors such as indicated at 76, 76a, there also being six such corridors in the construction illustrated. A partition 78 in the cavity 72 divides the housing 10c into two compartments. The cavity 72 also has therein a partition 80 having an aperture 82 therein which restricts the flow of fluid through the detector. A detecting cathode also similar to that shown in FIG. 1 is mounted in the partition 78. The partition 78 has a filter corridor 84 similar to that utilized in the construction of FIG. 5. A pair of flexible diaphragms 86, 88, one of each of which is concentrically mounted in the opening for each cavity 72, 74 respectively, is provided for the compartments. The flexible diaphragm 88 which is mounted in the outermost concentric cavity 74 is also slightly recessed therein, the signal to be measured being applied to the diaphragm 86. Another flexible diaphragm 90 is mounted over the detecting cathode for restricting the flow of fluid therethrough when a very low frequency signal is applied to the device similarly as for the construction of FIG. 5. Electrodes 92, 94 are provided for the compartments and each compartment is filled with a solution containing a reversible redox system. It will thus be apparent that this construction provides for a touch detector which is capable of filtering out very low frequency signals and whose response to rotation is decidedly reduced.

A number of touch detectors embodying the invention and of the constructions illustrated have been made and tested. The tests were conducted by subjecting the touch detectors to a variety of conditions of vibration. These tests proved the effectiveness of the invention in that the response of the touch detectors was satisfactory throughout the tests.

By way of illustration, one series of tests was conducted on logarithmic touch detectors of the construction shown in FIG. 1. The touch detectors were constructed utilizing a housing made from polytrifluoromonochloroethylene and which was fabricated by conventional molding techniques. The housing for each detector was of a size approximately ½ inch thick and 1½ inches in diameter, and it had a pair of cavities therein about ½ inch in diameter. The detecting cathode were made from a platinum sheet 0.001 inch thick having an orifice therein 0.015 inch in diameter, and were insulated with a layer of polytrifluoromonochloroethylene 0.001 inch thick on each side. A pair of platinum anode wires 0.10 inch in diameter and approximately one inch long were provided for the compartments, and two flexible diaphragms made from 0.004 thickness sheets of polytrifluoromonochloroethylene were heat sealed to the housing, one each in the opening for each cavity therein in the same plane in the housing. The compartments were filled with a solution of 0.1 N $I_2$ and 1.0 N KI with 0.01 percent Versene in distilled water. The touch detectors of this construction had an average weight of about two ounces. These touch detectors were connected to a biasing circuit including a 0.9 volt battery and were tested under conditions whereby an alternating pressure was applied to one diaphragm. The apparatus utilized to apply the pressure was of the type described in "Apparatus for Absolute Measurement of Analyogus Impedance of Acoustic Elements," Journal of Acoustical Society of America, vol. 24, p. 649, 1952, by George B. Thurston. The pressure amplitude was held constant at about 150 dynes/cm.$^2$ R.M.S. throughout the test. The frequency, however, was varied through a wide range and the response of the touch detectors to these pressure signals was recorded. The results of these tests are shown graphically by the curve of FIG. 7.

It wil be observed from FIG. 7 that the frequency response of touch detectors embodying the invention and used in the tests is a maximum at one frequency. This is analogous to the "tuning" characteristic of an electrical series RLC circuit. The frequency at which the response is a maximum is the "tuned" frequency. Many advantages made possible by this characteristic of touch detectors embodying the invention will be apparent to those skilled in the art; for example, their "tuning" characteristics may be utilized to give preference to signals of certain frequencies. Moreover, as an indication of the sensitivity of the touch detectors tested, a suitable output signal is obtained, for example, from a sinusoidal displacement of the diaphragm of less than a micron at the tuning frequency of the detector. Also, a sinusoidal force amplitude of about $\frac{1}{100}$ gram at this frequency is also sufficient to produce a useable signal from the detector.

Referring to FIG. 8, a similar curve is shown for the frequency response of a touch detector of the construction shown in FIG. 5. The curve was plotted from data obtained by calculating the response of the device utilizing the filter component values. The dotted line shown is an aproximation of the response with additional damping added to the circuit. This is more nearly the response which would be obtained in actual practice due to the damping effect of many driving sources. The response curve shows the input pressure which is required to maintain a constant detector output current.

From the above it will be appreciated that touch detectors embodying the invention are capable of giving a satisfactory response to a signal even though the detector is subjected to motion such as vibration. Thus the touch detector of the invention may be used as a limit switch for controlling precise machining operations. Or, it may be used as a limit switch for meters and recorders of various types to indicate preset levels, such as the level of liquids in a vessel. The construction of a touch detector as shown in FIG. 5 is particularly well suited for counting the heartbeat or pulse of a human. The advantage of the sharp fall off on the low frequency end of the curve shown in FIG. 8 becomes apparent in view of the normal low frequency body motion encountered.

It will be apparent to those skilled in the art that a number of different materials may be used in the manufacture of touch detectors of the invention. For instance, the housing of the touch detector may be composed of other plastic materials than that already mentioned, for example, nylon, polyethylene and polymethylmethacrylate may be used. It is also possible to construct the housing out of glass. The electrodes for the touch detector should be inert to the electrolyte solution and preferably are composed of platinum, but there are a number of other materials which may also be used. For example, pyrolytic carbon electrodes of the type disclosed in the application of G. E. Evans et al., Serial No. 777,012, filed November 28, 1958, now Patent 3,054,030, may be used.

In addition to the iodine-iodide system, the electrolyte solution for a touch detector embodying the invention may be composed of the ferrocyanide-ferricyanide and cerous-ceric systems, for example. The electrolyte is dissolved in a solvent, the requirements of which are that it dissolve the measured species of the redox system and permit one of the measured species to become ionized. Water is a suitable solvent. In addition to water, other suitable solvents, for example, are alcohols such as methyl and ethyl alcohol, or mixtures of these with water.

I claim:

1. An electrochemical touch detector comprising a housing divided into a pair of compartments; a partition between said compartments; a detecting electrode in said partition; an electrode and electrolyte in each of said compartments, said electrolyte filling said compartments and comprising a solution containing a reversible redox system; and flexible diaphragms for said compartments, said flexible diaphragms being mounted on the same side of said housing.

2. A touch detector as defined by claim 1 in which said flexible diaphragms lie in substantially the same plane.

3. A touch detector as defined by claim 1 in which said flexible diaphragms are concentrically mounted in said housing.

4. A touch detector as defined by claim 1 in which said partition has a filter corridor directly connecting said compartments and in which a flexible diaphragm is mounted over said detecting electrode in one of said compartments.

5. A touch detector as defined by claim 1 in which said detecting electrode comprises a thin platinum disc having a tiny orifice therein for permitting fluid flow from one compartment to the other.

6. A touch detector as defined by claim 1 in which said reversible redox system is the iodine-iodide system.

7. An electrochemical touch detector comprising a housing having therein a pair of interconnected cavities, said cavities having openings on the same side of said housing; a partition in one of said cavities dividing said housing into two compartments; a detecting electrode in said partition; an electrode and electrolyte in each of said compartments, said electrolyte filling said compartments and comprising a solution containing a reversible redox system; and flexible diaphgrams for said compartments, said flexible diaphragms being mounted in said openings for said cavities.

8. An electrochemical touch detector comprising a housing having therein a pair of adjacently disposed cavities and a corridor connecting said cavities, said cavities having openings on the same side of said housing; a partition in one of said cavities dividing said housing into two compartments; a detecting electrode in said partition; an electrode and electrolyte in each of said compartments, said electrolyte filling said compartments and comprising a solution containing a reversible redox system; and flexible diaphragms for said compartments, said flexible diaphragms being mounted in said openings for said cavities in substantially the same plane in said housing.

9. An electrochemical touch detector comprising a housing having therein a pair of concentric cavities and a plurality of substantially equally spaced radial corridors connecting said cavities, said cavities having openings on the same side of said housing; a partition in one of said cavities dividing said housing into two compartments; a detecting electrode in said partition; an electrode and electrolyte in each of said compartments, said electrolyte filling said compartments and comprising a solution containing a reversible redox system; and flexible diaphragms for said compartments, said flexible diaphragms being concentrically mounted in said openings for said cavities in substantially the same plane in said housing.

10. An electrochemical touch detector comprising a housing having therein a pair of adjacently disposed cavities and a corridor connecting said cavities, said cavities having openings on the same side of said housing; a partition in one of said cavities dividing said housing into two compartments, said partition having a detecting electrode mounted therein and a filter corridor directly connecting said compartments; an electrode and electrolyte in each of said compartments, said electrolyte filling said compartments and comprising a solution containing a reversible redox system; a pair of flexible diaphragms for said compartments, said flexible diaphragms being mounted in said openings for said cavities; and a flexible diaphragm mounted over said detecting electrode in one of said compartments.

11. An electrochemical touch detector comprising a housing having therein a pair of concentric cavities and a plurality of substantially equally spaced radial corridors connecting said cavities, said cavities having openings on the same side of said housing; a partition in one of said cavities dividing said housing into two compartments, said partition having a detecting electrode mounted therein and a filter corridor directly connecting said compartments; an electrode and electrolyte in each of said compartments, said electrolyte filling said compartments and comprising a solution containing a reversible redox system; a pair of flexible diaphragms for said compartments, said flexible diaphragms being concentrically mounted in said openings for said cavities; and a flexible diaphragm mounted over said detecting electrode in one of said compartments.

References Cited by the Examiner
UNITED STATES PATENTS

| | | | |
|---|---|---|---|
| 2,685,025 | 7/1954 | Root | 317—231 X |
| 3,001,175 | 9/1961 | Christoph | 317—231 X |
| 3,023,397 | 2/1962 | Reed | 317—231 X |

JOHN W. HUCKERT, *Primary Examiner.*

SAMUEL BERNSTEIN, *Examiner.*